Nov. 17, 1931.  W. F. OLIVER  1,832,136
BRAKE SHOE AND MOUNTING THEREFOR
Filed June 4, 1928
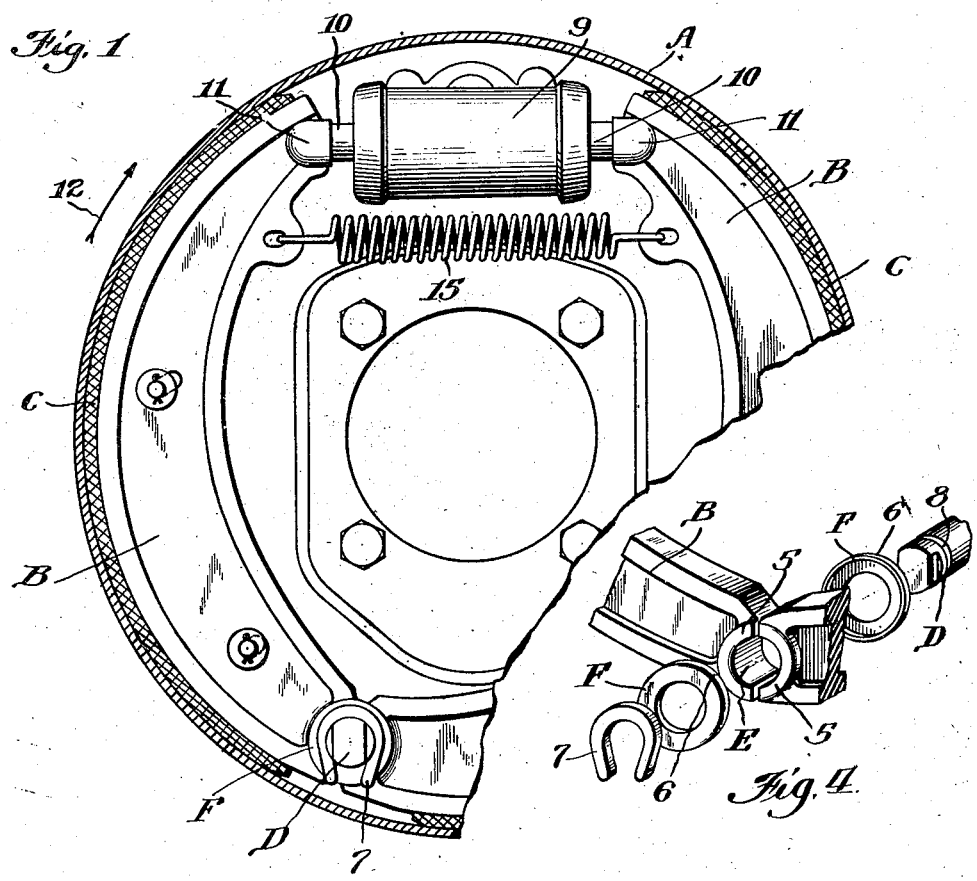
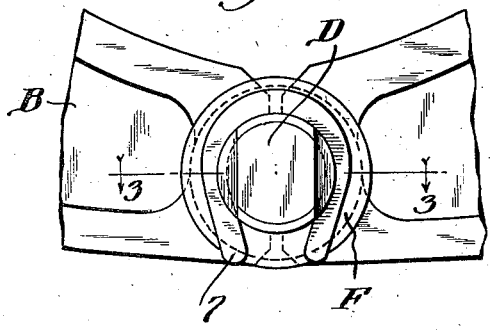
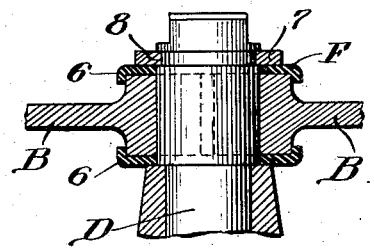
Inventor
Wallace F. Oliver Patented Nov. 17, 1931

1,832,136

UNITED STATES PATENT OFFICE

WALLACE F. OLIVER, OF DETROIT, MICHIGAN, ASSIGNOR TO HYDRAULIC BRAKE COMPANY, OF LOS ANGELES, CALIFORNIA, A CORPORATION OF CALIFORNIA

BRAKE SHOE AND MOUNTING THEREFOR

Application filed June 4, 1928. Serial No. 282,662.

My invention relates to an improvement in brake shoes and mounting therefor.

An object of the invention is to provide a brake shoe and mounting wherein a pair of the shoes may be mounted upon a single mounting pin so as to distribute the thrust of the shoes over diametrically opposite surfaces of the pin.

In the ordinary type of mounting for opposed brake shoes and particularly in the internal expanding type of brake assembly the shoes are independently mounted upon separate mounting pins slightly spaced apart from one another or the bearing portions at the heels of the opposed shoes are offset.

My improved brake shoes and mounting contemplates the use of a single mounting pin without necessitating the offset of the bearing portions of the shoe and consequent irregular distribution of thrust upon the pin.

A further object is to provide brake shoes and mounting wherein a single mounting pin is employed for two opposed shoes and in which the width of the thrust bearing surfaces of the shoes is approximately that of the length of the mounting pin.

Another object is to provide a brake shoe and mounting in which removal of the shoes from the mounting pin is greatly facilitated.

One form of my improved brake shoe and mounting is illustrated in the accompanying drawings in which Fig. 1 is a fragmentary side elevation of a wheel brake assembly illustrating my improved brake shoe and mounting, Fig. 2 is an enlarged fragmentary view of the brake shoe mounting, Fig. 3 is a sectional view along the line 3—3 of Fig. 2, and Fig. 4 is a prospective view of the brake shoe mounting with the parts separated.

In general the brake shoes and mounting selected for illustration herein is of the internal expanding type operating within a brake drum A and comprises a pair of rigid shoes B supporting brake lining C in registration with the drum and a mounting for the shoes. This mounting comprises a single mounting pin D, semi-cylindrical thrust bearing surfaces E at the inner ends of shoes B which engage with diametrically opposed sides of pin D and flanged retaining rings F for preventing disengagement of the bearing surfaces E from pin D.

The shoes B are each formed with semi-circular bosses 5 at each side of and contiguous with bearing surfaces E. Each bearing surface forms an arc of slightly less than 180° to permit pivoting of its shoe about the mounting pin without interfering with the complementary shoe. The effective surface of bearings E is therefore relatively large. Flanged rings F encompass the mounting pin D, one on each side of the aligned shoes B, and their flanges 6 overhang the semi-circular bosses 5. A locking clip 7 is secured to pin D by engagement with a groove 8 formed in the pin, and the parts thus assembled are retained against separation.

In operation, a wheel brake assembly of the type illustrated is actuated by a fluid motor 9 having brake shoe actuating rods 10 engageable with the free ends 11 of shoes B to force the shoe ends apart, thus moving the brake lining C into engagement with brake drum A. This movement of the shoes is accompanied by a relatively great thrust pressure of the heel or pivotally mounted end of the shoes against pin D. The thrust of each shoe will be uniformly distributed throughout the entire area of the relatively large bearing surfaces E upon directly opposite surfaces of pin D. Thus the thrust movement of one shoe will oppose that of the other and practically no strain will be exerted upon mounting pin D except for that additional and greater thrust of one of the shoes built up by the wrapping effect of the shoe. This wrapping effect is present in that shoe having its free end extending toward the direction of travel of the brake drum. In Fig. 1, the arrow 12 illustrates the direction of travel of drum A and the wrapping effect when present will be built up in that shoe to the right of the fluid motor 9.

While the shoes B are in inoperative position and are drawn toward one another by a spring 15, the retaining rings F and bosses 5 of the shoes preclude shifting of the shoes upon the pin or disengagement of the surfaces E with the bearing surfaces of the pin. In other words, rings F and bosses 5 perform that function ordinarily performed by the remaining semi-cylindrical part of the bearing surfaces, which in my improved shoe and mounting has been entirely eliminated.

A brake shoe and mounting as herein described is extremely simple in construction and is particularly well adapted for quick dis-assembly or removal of the shoes.

I have also made possible a material increase in the effective length of the shoe by doing away with the necessity of employing two mounting pins and hence shoes of shorter length.

Having thus illustrated and described the nature and an embodiment of my invention, what I claim and desire to secure by United States Letters Patent is as follows:

1. In a brake of the class described, a pair of arcuate brake shoes in circumferential alignment and having cylindrical bearing surfaces at their inner and adjacent ends, a mounting pin, said bearing surfaces engaging with diametrically opposite sides of said mounting pin, outwardly extending semi-circular bosses formed on said shoes on both sides thereof and contiguous with said bearing surfaces, separate retaining members encompassing said mounting pin, one on each side of said shoes, said retaining members having their flanges overhanging the entire peripheral edge of the bosses to retain the shoes against movement away from the mounting pin, and detachable locking means associated with said pin for preventing movement of said shoes and retaining members along said pin.

2. In a brake of the class described, a pair of arcuate brake shoes in circumferential alignment and having cylindrical bearing surfaces at their inner and adjacent ends, a mounting pin, said bearing surfaces engaging with diametrically opposite sides of said mounting pin, a laterally extending semi-circular boss formed on each of said shoes and contiguous with said bearing surfaces, a retaining member having a flange overhanging the entire peripheral edge of the bosses to retain the shoes against movement away from the mounting pin, said retaining member located entirely at one side of said shoes and readily removable to permit removal of said shoes without disturbing said pin, and detachable locking means associated with said pin for preventing movement of said shoes and retaining member along said pin.

3. In a brake of the class described, a pair of arcuate brake shoes in circumferential alignment and having cylindrical bearing surfaces at their inner and adjacent ends, a supporting member, a mounting pin carried thereby, said bearing surfaces engaging with diametrically opposite sides of said mounting pin, outwardly extending semi-circular bosses formed on said shoes on both sides thereof and contiguous with said bearing surfaces, a retaining member confined between said shoes and said support and having a flange overhanging the entire peripheral edge of the bosses formed on the adjacent side of said shoes, removable locking means associated with an end of said pin, and a separate retaining member overhanging the entire peripheral edges of the bosses adjacent said locking means, said separate retaining member held in place solely by said locking means, said locking means preventing movement of said shoes and retaining member along said pin.

In witness whereof, I hereunto subscribe my name this 29 day of May, 1928.

WALLACE F. OLIVER.